TRANSISTOR CIRCUIT CAPABLE OF DELIVERING, INDEPENDENTLY OF THE LOAD, AN OUTPUT CURRENT PROPORTIONAL TO THE DIFFERENCE BETWEEN TWO VOLTAGES
Filed Dec. 4, 1961
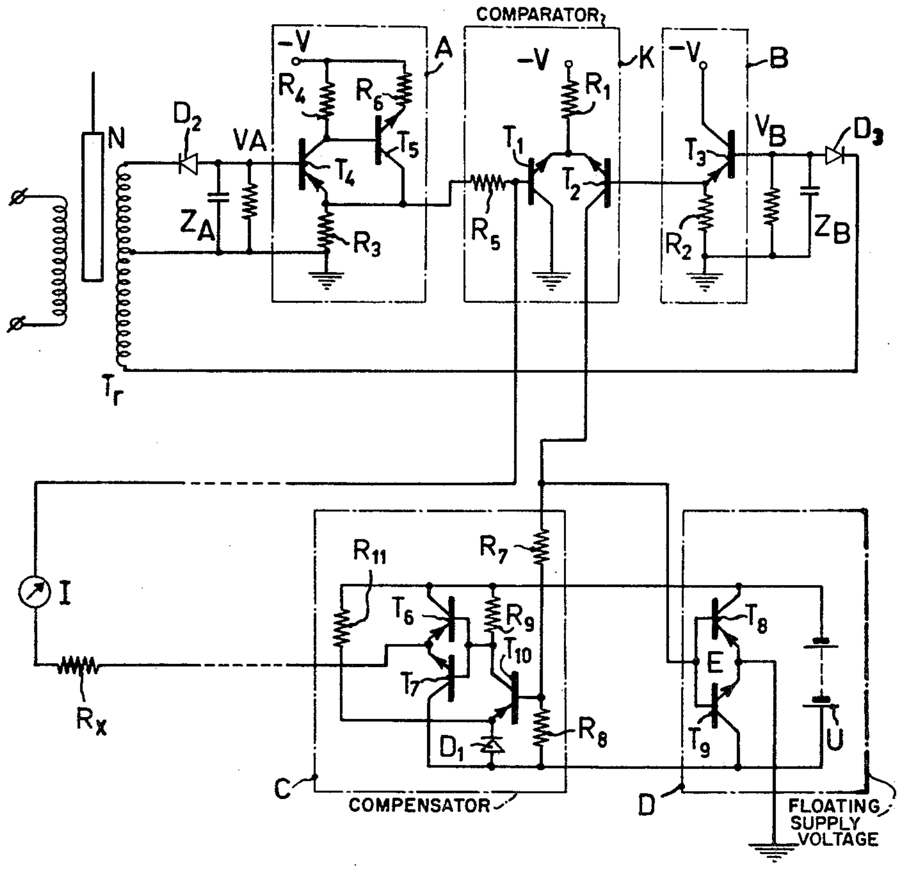
INVENTOR
GILLES DUPIRE
MICHEL LE DIBERDER
BY [signature]
AGENT United States Patent Office 3,218,468
Patented Nov. 16, 1965

3,218,468

TRANSISTOR CIRCUIT CAPABLE OF DELIVERING, INDEPENDENTLY OF THE LOAD, AN OUTPUT CURRENT PROPORTIONAL TO THE DIFFERENCE BETWEEN TWO VOLTAGES

Gilles Dupire, Paris, and Michel Le Diberder, La Raincy, France, assignors to North American Philips Company, Inc., New York, N.Y., a corporation of Delaware Filed Dec. 4, 1961, Ser. No. 156,804
Claims priority, application France, Dec. 8, 1960, 846,292
7 Claims. (Cl. 307—88.5)

This invention relates to a transistor circuit capable of delivering, independently of the load, an output current proportional to the difference between two voltages.

Such a circuit may in particular be used for remote measurements or controls. It comprises a comparator to which the said two voltages are applied and a compensator which receives a deviation signal from the comparator and returns a correcting signal to the comparator. A variable element delivers a voltage $V_A$ which is measured in the comparator by comparing it with a reference voltage $V_B$. The comparator delivers a current proportional to the voltage difference $V_A - V_B$ and, from this current and by means of the compensator, a deviation current is obtained which is fed back to the input of the comparator for modifying the signal derived from $V_A$ until the two signals applied to the comparator are identical. Such a circuit is known per se.

An object of the invention is to provide a transistor circuit of this kind which offers a high reliability in operation and satisfies severe operating conditions.

These conditions are, for example, in a special case envisaged as follows:

(1) The input on the side of the voltage to be measured ($V_A$) has a high impedance (from 30,000 to 40,000 ohms).

(2) The output of the compensator acts as a current injector, that is to say that the value of the output current must remain substantially unaffected by a variation in the resistance of the load (for example from 0 to 1,500 ohms). This is necessary because the installations, all of the same type, must be capable of operating irrespective of the distance, varying from one installation to an other, between the assembly comprising the comparator and the compensator, which is situated at the place of measurement, and the measuring indicator arranged at a site which is more or less distant. It is furthermore possible to arrange several indicators in series and at different sites without the installation requiring any correction.

(3) It must be possible for the output current of the compensator to be positive or negative (according as $V_A$ is greater or smaller than $V_B$), the output current varying for example from —5 ma. to +5 ma.

(4) The accuracy of the conversion into current for measurement is comparatively high and may be influenced by an increase in temperature (of the order of 1% from 0° C. to 45° C.; of the order of 5% from —20° C. to +55° C.).

The transistor circuit according to the present invention is characterized in that the compensator is fed with floating voltage under control of the said deviation signal, the output of the comparator being coupled to the common junction point of the bases of a p-n-p-type transistor and of an n-p-n-type transistor the emitter-collector paths of which are connected in series, which series-combination is connected to a direct-current source, and the common point of the two transistors being connected to a point of fixed potential with respect to the comparator.

Preferably, the voltage to be compared is applied to the base of a first transistor, the output of which is connected to the base of a second transistor of the opposite conductivity type. The emitter of the first transistor is connected to the collector of the second transistor and to a common polarizing and load resistor.

In order that the invention may be readily carried into effect, it will now be described in detail, by way of example, with reference to the accompanying drawing showing diagrammatically one embodiment of the circuit according thereto.

The circuit shown substantially comprises the following parts:

A comparator K to which the difference between the voltages to be compared $V_A$ and $V_B$ is applied by means of members A and B;

A compensator C which receives the output voltage (deviation signal) from the comparator and returns to it a correcting signal comprising a proportional correcting current $i$ which traverses a load resistor $R_x$ and at least one measuring indicator I (milliammeter). The compensator is also coupled to a device D including a voltage source U.

The comparator K comprises, as is known per se, two transistors $T_1$ and $T_2$ connected in opposition, the emitters of which are connected to a resistor $R_1$ the other extremity of which is connected to a terminal —V of a source of supply voltage. The collector of transistor $T_1$ is connected to ground (that is to say to the positive supply terminal) whereas the collector of transistor $T_2$ is connected to the input of the compensator, the output of which is connected to the base of transistor $T_1$ via load resistor $R_x$ and milliammeter I.

Since a high impedance source is being used, the voltages $V_A$ and $V_B$ must not give rise to appreciable currents. Voltages $V_A$ and $V_B$ are therefore applied to the bases of the transistors $T_1$ and $T_2$ by means of isolation devices A and B. The device B, which delivers only a reference voltage $V_B$, need comprise only one transistor $T_3$, connected as an emitter follower. In this transistor, the voltage $V_B$ is applied to the base, the collector is brought to the potential —V and the emitter is connected to earth through a load resistor $R_2$ and directly connected to the base of transistor $T_2$. As regards the member A, this comprises two transistors $T_4$ and $T_5$ connected in cascade. The voltage $V_A$ is applied to the base of the p-n-p-type transistor $T_4$. Its collector is connected through a resistor $R_4$ to the supply voltage —V and directly to the base of the n-p-n-type transistor $T_5$. The emitter of $T_4$ is connected to earth through resistor $R_3$ and directly to the collector of transistor $T_5$ which passes the output current of the device A through a resistor $R_5$ to the base of transistor $T_1$. The passage of a comparatively large current through transistor $T_4$ is prevented by degenerative feedback between the collector of transistor $T_5$ and the emitter of transistor $T_4$, and the temperature behaviour of $T_4$ remains approximately the same as that of $T_3$. The emitter of transistor $T_5$ is connected through a resistor $R_6$ to the supply voltage —V.

In this way, the collector current of transistor $T_5$ is controlled by the collector current of transistor $T_4$ and the collector current of transistor $T_5$ supplements or aids the emitter current of transistor $T_4$ in supplying the said output current (which may vary in practice from —10 ma. upwards). The differential resistance of the junction between the emitter and the base of transistor $T_4$ thus varies only slightly because the latter does not deliver the relevant output current.

If a "reversible" current (varying from, for example, —5 ma. to +5 ma.) is desired at the output of the compensator, a classical circuit including two transistors $T_6$ and $T_7$ is preferably used, which transistors are of the p-n-p-type and n-p-n-type respectively.

In this circuit, one transistor is operative at a time, dependent upon the polarity of the current desired. The other transistor is cut off but would normally remain connected to a supply voltage U which may be comparatively high. In fact, in order to deliver +5 ma. on 1500 ohms, the supply voltage may in practice be of the order of 30 volts. Under these conditions, the blocked transistor is connected to an unduly high inverse voltage, resulting in the risk of damage to this transistor.

This difficulty is solved by supplying the compensator with a floating voltage controlled by the deviation signal. This can be achieved by coupling the output of the comparator K at the collector of transistor $T_2$ to the base electrodes of a PNP type transistor $T_8$ and an NPN type transistor $T_9$. The emitter-collector paths of transistors $T_8$ and $T_9$ are connected in series across a direct current source of supply voltage U. The common junction point E of the emitter-collector paths of the transistors $T_8$ and $T_9$ are connected to a point of fixed potential, preferably ground. Since transistors $T_8$ and $T_9$ are of opposite conductivity types, the deviation signal applied to the base electrodes tends to simultaneously turn one transistor "off" while the other is turned "on." Depending upon which of these transistors is conductive, either the positive or negative terminal of the voltage source U is connected to ground through said conductive transistor.

The deviation signal is also applied to the base of transistor $T_{10}$ via resistors $R_7$ and $R_8$, thereby controlling the conduction thereof. The voltage drop across $R_9$ caused by the collector current of $T_{10}$ turns on either transistor $T_6$ or $T_8$, depending on the value of the deviation signal. In effect, the voltage of the source U is then applied to the series connection of either transistor $T_6$ or $T_7$, whichever one is conductive, and the load resistor $R_x$, indicator I, and resistors $R_5$ and $R_3$. The circuit is completed through ground and either $T_8$ or $T_9$, whichever one is conducting. At the same time, the other transistor, $T_7$ or $T_6$, which is cut-off, is protected against unduly high inverse voltages.

A portion of the deviation signal delivered by transistor $T_2$ is derived with the aid of a resistor $R_7$ in series with the input of the compensator circuit. To this end, $R_8$ is connected to one terminal of the source U and the common point of $R_7$ and $R_8$ is connected to the base of a transistor $T_{10}$. The collector-emitter path of transistor $T_{10}$ is connected in series with a resistor $R_9$ the other end of which is connected to the other terminal of the source U. The common point of $R_9$ and $T_{10}$ is connected to the bases of the transistors $T_6$ and $T_7$. The collector-emitter paths of the transistors $T_6$ and $T_7$ are connected in series across the source U and the common point of their emitters is connected through the load resistor $R_X$ and an indicator I to the base of transistor $T_1$. Under these conditions, the deviation signal derived causes one of the transistors $T_8$ or $T_9$ to be conductive. Let it be assumed, for example, that the deviation signal increases. The transistor $T_7$ of the compensator circuit delivers more current and the transistor $T_6$ of the same circuit is subject to a higher inverse voltage. However, the signal derived tends to open the transistor $T_8$ and hence to decrease the inverse voltage of $T_6$, and to cut off $T_9$ and hence to increase the supply voltage of transistor $T_7$.

The values and types adopted for the various elements of the circuit now follow hereinafter as an example:

| | |
|---|---|
| $T_1, T_2, T_5, T_7, T_9$ | OC 140 T. |
| $T_3, T_4$ | OC 47. |
| $T_6, T_8, T_{10}$ | OC 77. |
| $R_1$ | 1K ohm. |
| $R_2$ | 5.6K ohms. |
| $R_3$ | 600 ohms. |
| $R_4$ | 3.34 ohms. |
| $R_5$ | 100 ohms. |
| $R_6$ | 200 ohms. |
| $R_7$ | 15K ohms. |
| $R_8$ | 1K ohm. |
| $R_9$ | 10K ohms. |
| $R_X$ | Variable (from 0 to 1,500 ohms). |

It should be noted that it is advantageous to include a diode $D_1$, for example of the type OA 85, in the connection between the emitter of transistor $T_{10}$ and the corresponding terminal of the source U, the common point of $D_1$ and $T_{10}$ being connected to the collector of transistor $T_6$ through a resistor $R_{11}$ of 70 kilo ohms.

In the embodiment shown in the figure, the voltage $V_B$ with which the voltage $V_A$ is compared, may also be made variable. Both of these voltages are derived from a common source of A.C. voltage by means of a transformer $T_r$ having a primary winding connected to this source and a tapped secondary winding. The tapped secondary winding is connected to ground. The transformer further includes a movable core N for varying the magnetic coupling between the primary and secondary windings. The alternating voltages produced between either end terminal winding and the ground tap are rectified by means of diodes $D_2$ and $D_3$, filtered by means of capacitors $Z_A$ and $Z_B$, and supplied to the base electrodes of transistors $T_4$ and $T_3$, respectively. The core N may be made integral with a member whose displacement or position is to be measured.

Let us first assume that core N is positioned so that the voltage $V_A$ is larger than the voltage $V_B$. Therefore, since $V_A$ and $V_B$ are both negative, $V_A-V_B<0$. Under these conditions, the collector current of transistor $T_2$ is larger than the collector current of transistor $T_1$ and flows primarily from ground through the emitter base path of transistor $T_3$ to the collector $T_2$. Transistor $T_8$ is thereby rendered conductive as well as transistors $T_{10}$ and $T_7$. A current path is now formed so that an output current flows from ground, through the emitter-collector path of $T_8$, the voltage source U, the collector-emitter path of $T_7$, the resistor $R_x$, the indicator I and the resistors $R_5$ and $R_3$.

The output current stabilizes at a value $$\frac{V_A-V_B}{R_5}$$

whereby the voltage difference $V_A-V_B$ which is effective between the base electrodes of the transistors $T_1$ and $T_2$ is exactly compensated by the voltage drop produced across the resistor $R_5$ by the output current flowing therein. If the core N is now displaced in a downward direction until $V_B$ becomes equal to $V_A$, the collector current of $T_2$ is still sufficient to render $T_8$ conductive. The output or measuring circuit again follows the path as just described. In this case, the output or measuring current is equal to zero.

If the core N is displaced still further in the downward direction, $V_B$ increases until $V_A$ eventually becomes so much smaller than $V_B$ that the collector current of $T_2$ becomes equal to the measuring current which now flows in the opposite direction through indicator I and resistors $R_X$, $R_3$ and $R_5$. The collector current of transistor $T_2$ no longer supplies any current to the base of transistor $T_8$. Transistors $T_8$ and $T_9$ are both cut-off, transistor $T_{10}$ is also cut-off, as well as transistor $T_7$. However, transistor $T_6$ is now conductive. The collector circuit of $T_2$ is now completed by the measuring circuit which follows the path from ground through resistors $R_3$ and $R_5$, indicator I, resistor $R_X$, transistor $T_6$, voltage source U, and resistors $R_8$ and $R_7$ to the collector of $T_2$. If $V_B$ increases still further, the collector current of $T_2$ eventually becomes so small that the base of transistor $T_9$ is driven in the forward direction by the voltage source U, via resistors $R_8$ and $R_7$. The collector current of $T_2$, if any, then flows through resistors $R_7$ and $R_8$, source U, the collector-emitter path of transistor $T_6$, resistor $R_X$, indicator I and resistors $R_5$ and $R_3$ to ground. The measuring circuit now runs through resistors $R_3$ and $R_5$, indicator I, resistor $R_X$, transistor $T_6$ and voltage source U as before, and from the positive terminal of source U to ground via transistor $T_9$.

What is claimed is:

1. A circuit arrangement for supplying an output current to a load circuit which is proportional to the difference between first and second input voltages, said current being substantially independent of load impedance variations within predetermined limits, said circuit comprising comparison means having first and second input means and an output circuit for deriving a deviation signal, means for supplying said first and second voltages to said first and second input means, respectively, compensator means having an output circuit and an input circuit coupled to said comparison means output circuit and responsive to said deviation signal for producing an output current in said compensator means output circuit, means for connecting said load circuit in series between said compensate means output circuit and one of said input means thereby to supply a correction signal to said comparison means, means for supplying a floating supply voltage to said compensator means controlled by said deviation signal, said supplying means comprising a direct current source of supply voltage coupled to said compensator means, first and second transistors connected in series across said voltage source to provide a common emitter-collector path and a common junction therebetween and each having a control electrode, means for coupling said deviation signal from the output circuit of said comparison means to the control electrodes of said first and second transistors, and means for connecting the common junction in the said common emitter-collector path of said first and second transistors to a fixed potential.

2. Apparatus as described in claim 1 wherein said output current is substantially independent of load impedance variations in the range of zero to fifteen hundred ohms.

3. A circuit arrangement for supplying an output current to a load circuit which is proportional to the difference between first and second input voltages, said current being substantially independent of load impedance variations within predetermined limits, said circuit comprising comparison means comprising first and second transistors and first and second input means therefor, means for applying said first and second voltages to said first and second input means, respectively, said first transistor comprising an output electrode for deriving a deviation signal determined by the difference in said first and second voltages, compensator means having an output circuit and an input circuit coupled to said output electrode and responsive to said deviation signal for producing an output current in said compensator means output circuit, means for connecting said load circuit in series with said compensator means output circuit and one of said input means thereby to supply a correction signal to said comparison means, means for supplying a floating supply voltage to said compensator means controlled by said deviation signal, said supplying means comprising a direct current source of supply voltage coupled to said compensator means, third and fourth transistors of opposite conductivity type connected in series across said voltage source to provide a common emitter-collector path and a common junction therebetween and each having a control electrode, means for coupling said deviation signal from the output electrode of said comparison means to the control electrodes of said third and fourth transistors, and means for connecting the common junction in the said common emitter-collector path of said third and fourth transistors to ground.

4. Apparatus as described in claim 3 wherein one of said input means comprises fifth and sixth transistors of opposite conductivity type and having base, emitter and collector electrodes, means for applying one of said input voltages to the base electrode of said fifth transistor, means connecting the collector electrode of said fifth transistor to the base electrode and said sixth transistor thereby supplying a drive current thereto, and means connecting the emitter electrode of said fifth transistor to the collector electrode of said sixth transistor and to a common impedance element, and means for connecting a supply voltage to the emitter electrode of said sixth transistor so that collector current for said sixth transistor flows through said impedance element thereby providing a feedback voltage for stabilizing the operation of said fifth transistor.

5. Apparatus as described in claim 3 wherein said compensator means comprises fifth and sixth transistors of opposite conductivity type connected in series across said voltage source and in parallel with said third and fourth series connected transistors, the series connection of said fifth and sixth transistors providing a common emitter-collector current path for said fifth and sixth transistors and a common junction therebetween, and means for connecting said output circuit of said compensator means to the common junction in the said common emitter-collector path of said fifth and sixth transistors.

6. Apparatus as described in claim 5 wherein each of said fifth and sixth transistors include a base electrode and said compensator means further comprises a transistor amplifier having a control electrode and an output electrode, means for applying said deviation signal to said control electrode, and means coupling the output electrode of said amplifier to the base electrodes of said fifth and sixth transistors.

7. A circuit arrangement for supplying an output current to a load circuit which is proportional to the difference between first and second input voltages, said current being substantially independent of load impedance variations within predetermined limits, said circuit comprising comparison means comprising first and second transistors and first and second input means therefor, means for applying said first and second voltages to said first and second input means, respectively, said first transistor comprising an output electrode for deriving a deviation signal determined by the difference in said first and second voltages, said second transistor having a corresponding output electrode, means for connecting the corresponding electrode of said second transistor to ground, compensator means having an output terminal and an input circuit coupled to said first transistor output electrode and responsive to said deviation signal for producing an output current at said output terminal, means for connecting said load circuit in series between said output terminal and said second input means associated with said second transistor thereby to supply a correction signal to said comparison means, means for supplying a floating supply voltage to said compensator means controlled by said deviation signal, said supply means comprising a direct current source of supply voltage coupled to said compensator means, third and fourth transistors of opposite conductivity type connected in series across said voltage source to provide a common emitter-collector path and a common junction therebetween and each having a control electrode, means for coupling said deviation signal from the output electrode of said comparison means to the control electrodes of said third and fourth transistors, and means for connecting the common junction in the emitter-collector paths of said third and fourth transistors to ground.

References Cited by the Examiner

UNITED STATES PATENTS 2,922,117 1/1960 Hood et al. ---------- 330—69

ARTHUR GAUSS, *Primary Examiner.*

UNITED STATES PATENT OFFICE

CERTIFICATE OF CORRECTION

Patent No. 3,218,468 November 16, 1965

Gilles Dupire et al.

It is hereby certified that error appears in the above numbered patent requiring correction and that the said Letters Patent should read as corrected below.

Column 3, line 34, for "$T_8$" read -- $T_7$ --; column 5, lines 20 and 21, for "compensate" read -- compensator --; column 6, line 4, for "and" read -- of --.

Signed and sealed this 10th day of January 1967.

(SEAL)
Attest:

ERNEST W. SWIDER
Attesting Officer

EDWARD J. BRENNE
Commissioner of Patent